(12) United States Patent
Richman

(10) Patent No.: US 8,755,110 B2
(45) Date of Patent: Jun. 17, 2014

(54) NON-PLANAR RING RESONATOR FOR PREVENTING EXCITATION OF BACKWARD WAVE IN A PASSIVE TRAVELING WAVE OPTICAL RESONATOR

(71) Applicant: Bruce A. Richman, San Mateo, CA (US)

(72) Inventor: Bruce A. Richman, San Mateo, CA (US)

( * ) Notice: Subject to any disclaimer, the term of this patent is extended or adjusted under 35 U.S.C. 154(b) by 0 days.

(21) Appl. No.: 13/687,603

(22) Filed: Nov. 28, 2012

(65) Prior Publication Data
US 2013/0135708 A1 May 30, 2013

Related U.S. Application Data

(60) Provisional application No. 61/629,885, filed on Nov. 30, 2011.

(51) Int. Cl.
*G02B 26/08* (2006.01)

(52) U.S. Cl.
USPC .......................................................... 359/298

(58) Field of Classification Search
USPC .......................................................... 359/298
See application file for complete search history.

(56) References Cited

U.S. PATENT DOCUMENTS

2002/0150340 A1* 10/2002 Ikeda et al. ..................... 385/39

* cited by examiner

*Primary Examiner* — James Jones
(74) *Attorney, Agent, or Firm* — Rankin, Hill & Clark LLP

(57) ABSTRACT

An optical traveling-wave resonator that includes a magneto-optically active member through which an optical beam propagates on a non-planar optical propagation path circuit. The resonator further includes at least one mirror in the optical propagation path circuit and a magnetic field generator for applying a magnetic field to the magneto-optically active member such that resonant optical frequencies of normal modes corresponding to traveling waves in opposite directions are substantially different.

11 Claims, 9 Drawing Sheets

NON-PLANAR RING RESONATOR FOR PREVENTING EXCITATION OF BACKWARD WAVE IN A PASSIVE TRAVELING WAVE OPTICAL RESONATOR

BACKGROUND OF INVENTION

1. Field of Invention

The present invention relates to a non-planar ring resonator for preventing excitation of backward wave in a passive traveling wave optical resonator.

2. Description of Related Art

Many optical applications require the use of a high-finesse traveling wave optical resonator (a "ring" cavity, so-called because the optical beam travels a one-way around a circuit in the resonator). In particular, cavity-enhanced spectroscopy ("CEAS") such as cavity ring-down spectroscopy ("CRDS"), optical frequency filters, and optical spatial mode filters, all use high-finesse traveling wave optical resonators in some of their implementations. No real optical element is perfect, however, and the mirrors used for such cavities scatter some of the radiation out of the intended traveling wave. Rayleigh scattering by gas in the optical beam may also occur. Since simple traveling wave resonators are symmetric with respect to direction of optical wave travel, this scattering may excite the backward traveling wave since the optical frequency is identical for forward and backward waves. Unintended excitation of this backward traveling wave often has deleterious consequences.

One of the main stated advantages of a traveling wave cavity is that it ideally does not return optical feedback to the source of optical excitation, such as a laser. Lasers are usually sensitive to such optical feedback and great care is necessary to minimize feedback. The backward wave in the traveling wave resonator will return optical feedback to the laser through the resonator input coupling. Another deleterious effect is the coherent transfer of forward wave energy to the backward wave in CRDS. This transfer of energy during the ring-down event causes the forward wave optical signal, ideally purely exponential in time, to be significantly non-exponential. This effect makes determining the actual optical loss of the resonator difficult and uncertain, thus degrading the performance of the optical spectroscopy.

Although an approximate mitigation to the non-exponential effect is to measure the sum of the forward and backward optical signals, which is approximately exponential if the coupling between forward and backward waves is weak, this solution still requires that the forward and backward beams are detected and summed with equal weight (see, e.g., He et al., Pub. No. US 2012/0242997 A1). This in turn requires at least careful optical alignment, sometimes also precise electronic gain adjustment, and maintenance of that alignment and gain.

BRIEF SUMMARY OF THE INVENTION

In view of the foregoing, the present invention is directed toward a non-planar ring resonator (NPRR), similar to a non-planar ring oscillator ("NPRO"), configured to prevent excitation of the backward wave by the forward wave. An optical traveling-wave resonator according to the invention comprises a magneto-optically active member through which an optical beam propagates on a non-planar optical propagation path circuit. The resonator further comprises at least one mirror in the optical propagation path circuit and a magnetic field generator for applying a magnetic field to the magneto-optically active member such that resonant optical frequencies of normal modes corresponding to traveling waves in opposite directions are substantially different, thereby preventing interaction and optical energy exchange between them.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The present invention provides a non-planar ring resonator configured to prevent excitation of the backward wave by the forward wave. As noted above, the resonator incorporating the non-planar ring resonator according to the invention comprises a magneto-optically active member through which an optical beam propagates on a non-planar optical propagation path circuit. The resonator further comprises at least one mirror in the optical propagation path circuit and a magnetic field generator for applying a magnetic field to the magneto-optically active member such that resonant optical frequencies of normal modes corresponding to traveling waves in opposite directions are substantially different.

Applicant notes that use of a non-planar ring oscillator for the purpose of selecting one-way laser oscillation in a gain medium was previously suggested by T. J. Kane and R. L. Byer (see, e.g., T. J. Kane and R. L. Byer, Opt. Lett. 10 (2), 65-67 (1985); and Kane et al., U.S. Pat. No. 4,578,793). Kane et al. referred to the device as a "monolithic isolated single-mode end-pumped ring" ("MISER"). Shortly thereafter, A. G. Nilsson, E. K. Gustafson and R. L. Byer published a detailed theory of operation and optimal design (see A. C. Nilsson, E. K. Gustafson and R. L. Byer, IEEE J. Quantum Electron. 25 (4), 767-790 (1989)—hereinafter referenced as the "Nilsson Article"; see also Nilsson et al., U.S. Pat. No. 5,043,996). The works by Kane et al. and Nilsson et al. were directed toward lasing mode selection in a resonator containing an active optical gain medium. In contrast, the present invention prevents coupling of the forward and backward traveling wave modes (by e.g. scattering) in a passive resonator (no optical gain). The present specification begins with the theoretical framework set forth in the Nilsson Article, and then applies the requirements for the passive resonator, different from the active resonator of the prior art, to determine specific design criteria, and the expected performance.

Figure 1A:
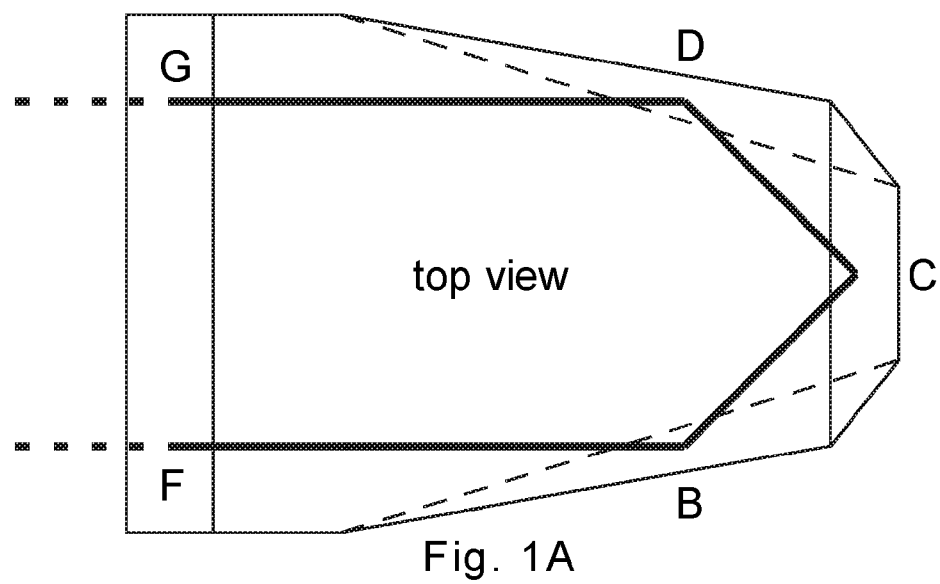
FIGS. 1A and 1B schematically depict a top view and a side view, respectively, of a non-planar ring oscillator according to an embodiment of the invention.
Figure 1B:
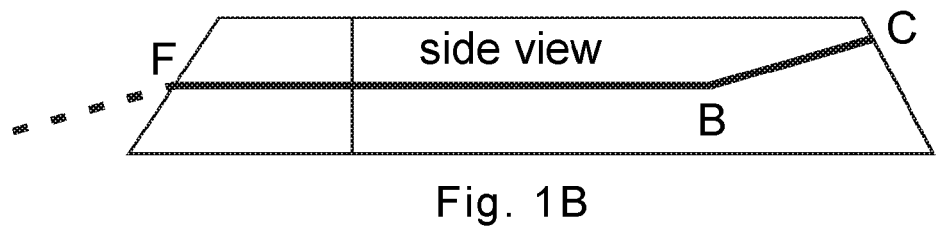

The NPRR in the present invention constitutes one end of a high-finesse optical resonator. The other end will typically be a single mirror with concave curvature to provide transverse mode stability. Similar ring traveling wave resonators for CRDS were disclosed in Zare et al., U.S. Pat. No. 5,912,740. In its simplest form, which is schematically illustrated in FIGS. 1A and 1B, the NPRR of the high-finesse resonator has two (dielectric) optical interfaces to the external end of the resonator (points F and G) and three total internal reflections (TIRs) (points B, C, and D). This configuration differs from the MISER-like application, which has a single partial reflection in place of the two dielectric interfaces (compare FIGS. 1A and 1B of this specification with FIGS. 2-5 of the Nilsson Article).

There are at least two other major differences:

(1) The present invention requires decoupling of the forward and backward wave modes (e.g. through scattering), most easily effected by breaking the forward-backward optical frequency degeneracy by an amount significantly larger than the sum of the line-widths of the primary forward and either backward mode. Increasing the loss of the backward wave mode(s) is beneficial but not essential. The referenced prior art devices required maximal loss differential, and frequency splitting was beneficial but not essential.

(2) The present invention prefers minimizing the loss of the selected forward mode, to maintain the highest possible finesse of the optical resonator (e.g. for CRDS or frequency filtering). This preference means that the optical polarization at the TIRs is preferably purely S (electric field parallel to dielectric interface, same as perpendicular to plane of reflection). The referenced prior art devices required that the sum of the TIR reflection phase differences between S and P polarizations equal (approximately) π radians.

Figure 2:
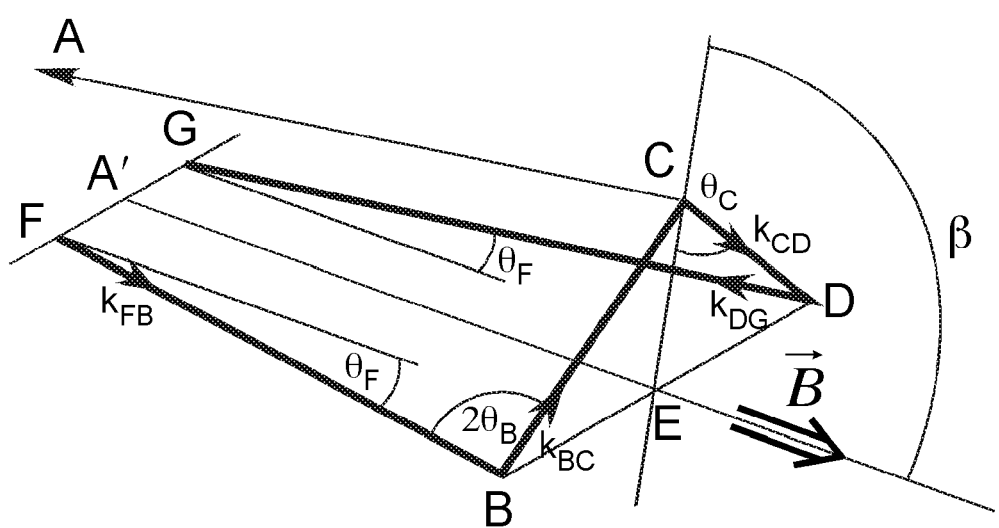
FIG. 2 shows the non-planarity angle, $\beta$, in the non-planar ring oscillator depicted in FIG. 1, and also defines geometric angles and directions.
Figure 3A:
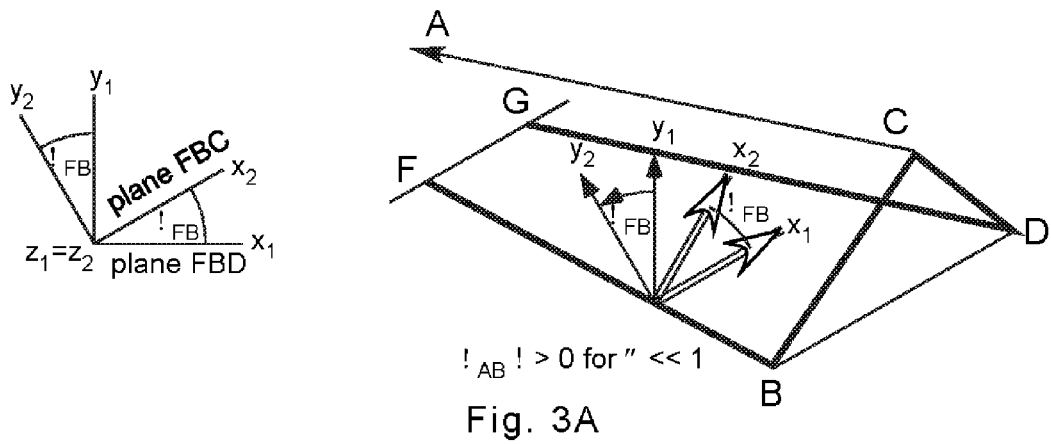
FIG. 3A shows the coordinate systems before and after the rotation in the plane of rotation (left) and in the 3D view (right) for the rotation between points F and B.
Figure 3B:
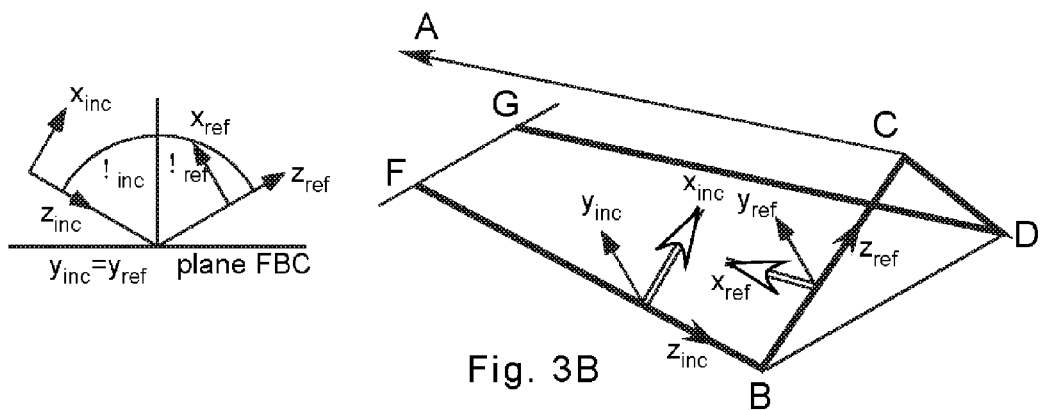
FIG. 3B shows the incident and reflected beam coordinate systems in the plane of reflection (left) and in the 3D view (right) at point B.
Figure 3C:
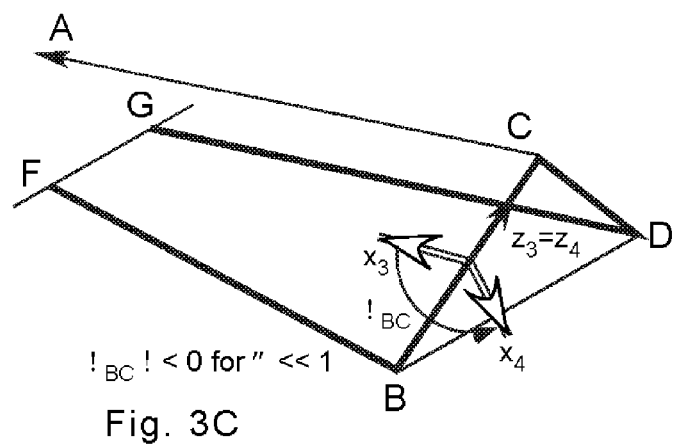
FIG. 3C shows the 3D view of the rotation between points B and C.

The present specification uses the same coordinate conventions and geometric definitions for the figures and the Jones matrices as used in the Nilsson Article. FIGS. 1A, 1B and 2 of the present specification are derived from FIGS. 2 and 3 of the Nilsson Article, except that the reflection at A is replaced by two dielectric interfaces F and G (as noted above). Similarly, the angle $\theta_A$ is replaced by $\theta_F$ and $\theta_G$ (typically, $\theta_F=\theta_G$). FIG. 2 shows the angle between the triangles (the non-planarity angle), β, and the unit wave vector directions $k_{FB}$ etc. (same or similar as in the Nilsson Article). The length of the (truncated) NPRR is A'E, and the isosceles triangles are now defined by their common half-base length BE. FIGS. 3A, 3B and 3C of the present application are derived from FIG. 4 of the Nilsson Article with the same changes as noted above.

In addition to the basic NPRR, the present specification also discusses enhancements. Making the two dielectric interfaces at Brewster's angle is one of the best methods to minimize optical loss. This is a commonly known technique to minimize the optical loss of an intracavity element in an optical resonator and was also used by Lehmann et al., U.S. Pat. No. 5,973,864, in an all-TIR resonator for ultra-broadband CRDS. (The present invention differs in that none of the reflections are necessarily TIR, and the magneto-optically active member does not need to retro-reflect the optical beam, e.g. FB parallel to DG.) The magnetic field source can be a combination of permanent magnet and electro-magnet; the electro-magnet is useful for optimizing the NPRR over a range of optical frequencies or for real-time optimization. The magnetic field may be adjusted (either during manufacture or in real time) by monitoring the balanced optical signals of the mixed S±P polarizations exiting the NPRR or at point C. The magnetic field along segments FB and DG can be independent of the field along segments BC and CD, and each can be adjusted independently by monitoring the balanced optical signals of the mixed S±P polarizations at (at least) two points. The NPRR can be coated with a low-index dielectric (so that the reflections are still TIR), to protect the TIR surfaces from contamination and damage. Input and output optical coupling can be done at the dielectric interface slightly different from Brewster's angle, or a dielectric coating at arbitrary angle, or by frustrated TIR at one of the TIR interfaces. The total optical path of the NPRR can be adjusted electro-optically, elasto-optically or similarly. The optical coupling (e.g. at Brewster's angle dielectric interface) can be adjusted by changing the magnetic field, including using that method as an optical switch within a ring-down event.

Jones Matrix Propagation of NPRR in High-Finesse Resonator

The polarization of the beam propagating in the NPRR in the high-finesse resonator is modeled with Jones matrices (see R. C. Jones, J. Opt. Soc. Am. 31 (7), 488-493 (1941)). The relevant Jones matrices model the interfaces F and G and the external portion of the resonator (as one matrix for simplicity), the Faraday rotation of the polarization caused by the magnetic field in the NPRR, the coordinate transformations between geometric planes, and the TIRs in the NPRR. Each element along the beam has a matrix for the counter-clockwise (CCW) propagation denoted with (+) (relative to the top view in FIG. 1A), and the clockwise (CW) propagation denoted with (−).

The external Jones matrix is, $$M_A^+ = M_A^- = \begin{bmatrix} \tilde{r}_p & 0 \\ 0 & \tilde{r}_s \end{bmatrix}$$

where $\tilde{r}_{p,s}$ are the complex effective reflection coefficients of the external propagation for P and S polarizations. Removing a common phase factor, these reduce to $$M_A^+ = M_A^- = \begin{bmatrix} r_p e^{i\frac{\Delta}{2}} & 0 \\ 0 & r_s e^{-i\frac{\Delta}{2}} s \end{bmatrix}$$

where $\Delta=\delta_p-\delta_s$ is the relative phase shift.

The Jones matrix for coordinate system rotation by angle $\alpha$ about the beam propagation (z) axis is $$R(\alpha) = \begin{bmatrix} \cos(\alpha) & -\sin(\alpha) \\ \sin(\alpha) & \cos(\alpha) \end{bmatrix}$$

FIG. 3A shows the coordinate systems before and after the rotation in the plane of rotation (left) and in the 3D view (right) for the rotation between points F and B. FIG. 3C shows the 3D view of the rotation between points B and C. By the same convention as Nilsson, $\alpha$ is positive for CCW rotation looking into the beam as in FIG. 3A (against the wave vector).

The Jones matrix for the TIRs at each vertex j=B, C, or D is $$M_j^+ = M_j^- = \begin{bmatrix} r_p e^{i\frac{\Delta_j}{2}} & 0 \\ 0 & r_s e^{-i\frac{\Delta_j}{2}} \end{bmatrix},$$

where the relative phase shift $\Delta_j$ is a function of the refractive index ratio, n, and the angle of incidence $$\tan\left(\frac{\Delta_j}{2}\right) = \frac{\cos(\theta_j)\sqrt{\sin^2(\theta_j) - \frac{1}{n^2}}}{\sin^2(\theta_j)}$$

where n is the ratio of internal to external refractive index.

FIG. 3B shows the incident and reflected beam coordinate systems in the plane of reflection (left) and in the 3D view (right) at point B.

Faraday rotation angle is proportional to the projection of the beam propagation direction onto the magnetic field, $\gamma=VLk\cdot B$, where V is the Verdet coefficient, B is the magnetic field vector, and L is the propagation length within the field. More generally, $\gamma$ is the integral over the optical path L of (V k·B). The Jones matrix for Faraday rotation of the polarization by angle $\gamma$ is $R(\gamma)$ (same as coordinate system rotation). The CCW and CW angles for each leg, however, have opposite sign $$M_{j\to k}^+ = R(\gamma_{jk})$$

$$M_{k\to j}^- = R(\gamma_{kj}) = R(-\gamma_{jk}).$$

Also note that $\gamma_{DG}=\gamma_{FB}$ since $\theta_G=\theta_F$. We can now write the total Jones matrix for each of the CCW and CW propagations (Nilsson eqs 21 and 22, with $M_D=M_B$ by symmetry)

$$M^+ = M_A R(\theta_{FB}-\gamma_{FB})M_B R(-\theta_{BC}-\gamma_{BC})M_C R(\theta_{BC}+\gamma_{BC})$$
$$M_B R(-\theta_{FB}+\gamma_{FB}),$$

$$M^- = R(-\theta_{FB}-\gamma_{FB})M_B R(\theta_{BC}-\gamma_{BC})M_C R(-\theta_{BC}+\gamma_{BC})M_B R$$
$$(\theta_{FB}+\gamma_{FB})M_A.$$

These are round-trip propagation matrices. Their eigenvectors define the stable polarization eigenmodes in the resonator, and their eigenvalues define the optical frequency and loss of the corresponding eigenmodes. The CCW modes are the "forward" modes, and the CW modes are the "backward" modes. One of the two CCW modes, called here the primary mode, is the one mode for which excitation is desired. Excitation of any of the other 3 modes is to be suppressed.

The parameters A'E, BE, CE, $\beta$, and $\theta_F$ fully define the NPRR dimensions and shape. As a set, they can be optimized to satisfy the conditions to achieve single-mode excitation (and any other requirements such as maintaining TIR in the NPRR).

Although the above derivation assumes three TIRs and one external reflection, the concept is general. More than three TIRs has been shown convenient for the design of NPROs (e.g. the Nilsson Article). For CRDS (or for any requirement of high finesse), however, usually, the minimum number of reflections is most desirable to minimize optical loss.

The same concept may be applied to evanescent-wave CRDS (or monolithic high-finesse resonators), in which case the external reflection is replaced by another TIR or (coated) mirror interface. Any or all of the TIRs can be substituted by a mirror (metal or dielectric coated, or uncoated depending on the reflectivity required).

Satisfying the Frequency Difference Condition

To satisfy the first requirement of this invention, the phase of the primary eigenvalue (corresponding to the excited resonator mode) should be substantially different from the other three eigenvalue phases so that the optical frequency of the primary mode is different from the others, thus preventing coherent coupling (by e.g. scattering) between them. The frequency difference between two modes is $\Delta\omega=\Delta\phi c/L_{opt}$, where $\Delta\phi$ is the phase difference and $L_{opt}$ is the total resonator optical path length (including the refractive index of the NPRR segment). $\Delta\omega$ must be larger than the sum of the resonance widths of the two modes (this condition can be relaxed if the non-primary mode loss is much greater than the primary mode, so that its resonance width is also much larger).

In some circumstances, another difference between modes besides frequency, such as polarization orthogonality (at each optical interface) between the primary and other modes, may also suffice to prevent excitation of the other modes. As noted above, high loss of the other modes is desirable so that any excitation is quickly damped, thus minimizing the coherent (stimulated) transfer of energy out of the primary mode.

Satisfying the Reflection Polarization Condition

As noted above, in its simplest form, the NPRR has TIR internally. It may, however, have non-TIR at any or all reflection interfaces. These could be metal or dielectric mirrors coated onto the NPRR surface. Another possible configuration uses another optical material in direct contact with the NPRR surface(s) to protect them from damage, chemical adsorption, or optical absorption of the evanescent wave. In this case, the interface may still be TIR if the NPRR refractive index is sufficiently higher than the refractive index of the second optical material.

Whatever configuration is chosen for the NPRR reflective interfaces, typically the losses upon reflection are lower for S-polarization than for P-polarization. This is the second condition (preferred, not necessary) for the invention. For the specific example detailed following, assume that the interfaces F and G are at Brewster's angle for a y-polarized beam. Then if $\beta=0$ (planar resonator) and without Faraday rotation, the y-polarized beam at F would naturally be S-polarized at interfaces B, C, and D, and y-polarized again at G. To maintain these polarizations through the NPRR for $\beta\neq 0$, the Faraday rotation must compensate for each coordinate system rotation for the forward (CCW) beam. Therefore $\theta_{FB} = +\gamma_{FB} = VA'EB \cos(\theta_F)$ (equation for $\theta_{DG}$ is redundant), and $\theta_{BC} = -\gamma_{BC} = -VCEB \cos(\beta)$, assuming the magnetic field B is parallel to AE. These are two additional constraints on the NPRR defining parameters. Note that for small $\beta$, $\theta_{FB} > 0$ and $\theta_{BC} < 0$, so that these constraints are consistent with the direction of the magnetic field parallel to AE as shown in FIG. 2. The magnetic field does not need to be parallel with AE; it could lie anywhere in the AEC plane, and if it lies between the projections of the perpendiculars to FB and BC, then it can compensate for $\theta_{FB}$ and $\theta_{BC}$ of the same sign. To compensate for an NPRR that is non-symmetric about the AEC plane, the direction of the magnetic field might lie outside the AEC plane.

A Specific NPRR Numerical Example

Consider a numerical example combining the above conditions and properties. The NPRR material is fused silica, which has very low bulk optical loss in the visible and near-IR. Its refractive index at wavelength $\lambda = 1.55$ μm is $n = 1.444$ (critical TIR angle=43.8°); its Verdet coefficient is V=3.8 radians/Tesla/m=0.22°/Tesla/mm. The interfaces F and G are at Brewster's angle (as shown in FIGS. 1A and 1B), and $\theta_F \approx 0$. Choose BE=15 mm, CE=9 mm, $\beta=1°$. We will determine |B| and A'E to complete the NPRR specification. We need some useful trigonometric relations among the angles $$\cos(2\theta_B) = \sin(\theta_F)\sin(\theta_C) - \cos(\theta_F)\cos(\theta_C)\cos(\beta)$$

$$\cos(\theta_{FB}) = \frac{\sin(\theta_C)\cos(\theta_F) + \cos(\theta_C)\sin(\theta_F)\cos(\beta)}{\sin(2\theta_B)}$$

$$\cos(\theta_{BC}) = \frac{\sin(\theta_F)\cos(\theta_C) + \cos(\theta_F)\sin(\theta_C)\cos(\beta)}{\sin(2\theta_B)}$$

We find from $\tan(\theta_C)$=CE/BE that $\theta_C$=59.04°. Computing the remaining angles $2\theta_B$=120.96°

$\theta_{FB}$=0.60°

$\theta_{BC}$=1.17°

We then obtain,

B=0.60 Tesla

A'E=4.62 mm

We also must verify that the backward eigenmodes will not couple to the forward S-polarized mode. Since the external mirror is near normal incidence in this example, its relative phase on reflection is $\Delta_A$=180°. The phase at B is $\Delta_B$=37.8°, and at C is $\Delta_C$=39.0°. The loss of the S-polarization at F and G (P-polarization at B and C) is 12.4% at each of F and G, and the loss for P-polarization is ~zero. The Jones matrices at A, B, and C are (full phases moved to P-polarization)

$$M_A = \begin{bmatrix} -0.876 & 0 \\ 0 & 1 \end{bmatrix}, M_B = \begin{bmatrix} +0.79 + i0.61 & 0 \\ 0 & 1 \end{bmatrix},$$

$$M_C = \begin{bmatrix} +0.78 + i0.63 & 0 \\ 0 & 1 \end{bmatrix}.$$

Computing the round-trip Jones matrices $$M^+ = M_A M_B M_C M_B = \begin{bmatrix} 0.876 e^{-i1.14} & 0 \\ 0 & 1 \end{bmatrix}$$

so that the eigenvalues are 1 and $0.876 e^{-i1.14}$.

$$M^- = R(-2\theta_{FB}) M_B R(2\theta_{BC}) M_C R(-2\theta_{BC}) M_B R(2\theta_{FB}) M_A =$$

$$\begin{bmatrix} 0.362 - 0.800i & 0.053 - 0.034i \\ -0.046 + 0.030i & 0.998 + 0.002i \end{bmatrix}.$$

Its eigenvalues are $0.9996 e^{i0.0050}$ and $0.876 e^{-i1.15}$. To verify that the frequency shift of the first backward eigenmode is adequate, compare the shift (relative to the resonator free spectral range FSR) with the resonator finesse. The FSR/frequency shift is $2\pi$/(eigenmode argument)=1250; the finesse is $2\pi/(1-(\text{eigenmode amplitude})^2)$=7285 (the forward mode is assumed to have total losses of ~100 ppm, which is 1/10 the loss of the backward mode, so the backward line-width dominates this calculation), which is a few times the FSR/frequency so the shift is anticipated to be adequate. The forward and backward high loss modes (eigenmode amplitude=0.876) have such high loss that they cannot accumulate any significant optical power, so their shift/line-width ratio is irrelevant. In addition, the polarization of each of the high loss modes is nearly perpendicular to the polarization of each of the low loss modes, further reducing the coupling efficiency between them.

Design Improvements for Implementation

Is the simplicity of the design example above sufficient to implement? That design assumes an infinitesimal, diffraction-free geometric beam ray. Realistically, the beam has finite transverse extent, and associated finite divergence. These two properties of a real optical beam affect the Faraday and the TIR interactions, respectively.

Figure 4:
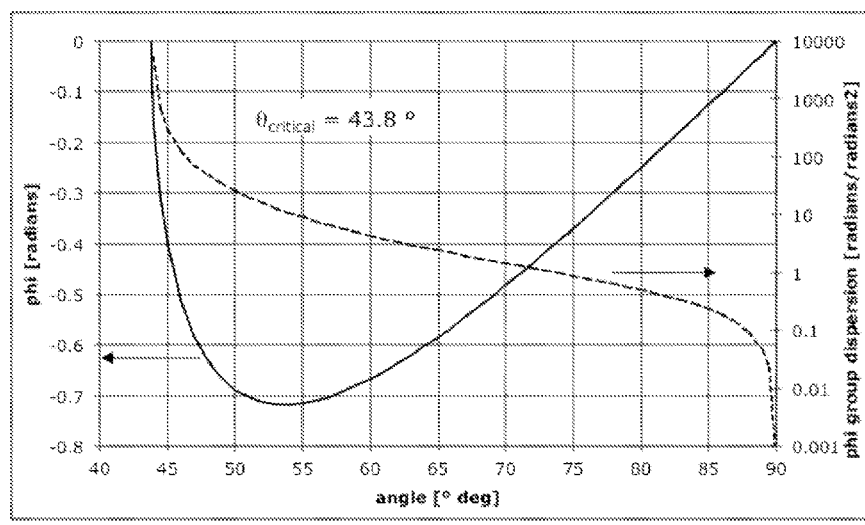
FIG. 4 shows the reflection phase and its $2^{nd}$ derivative with respect to incidence angle (the lowest order group spatial dispersion coefficient) for fused silica and $\lambda=1550$ nm.

First, consider the TIR interaction with the plane-wave decomposition components of a divergent beam. The components that are incident at less than the critical angle will not be totally reflected, and will thus suffer significant loss. To avoid this problem, the incident angle of the central beam ray should be large enough so that all significant plane-wave beam components are incident above the critical angle. In addition, the phase of reflection is a function of the incident angle of the beam. The terms of the Taylor series expansion of this phase function each have physical significance. The zero-order term is a simple phase shift, which affects the resonant frequency but not the beam propagation. The linear term causes a spatial group offset (mathematically equivalent to temporal group delay), the penetration depth of the beam into the evanescent space, effectively pushing the vertex of the reflection into that space. Higher order terms are mathematically equivalent to temporal group delay dispersion; these terms cause beam spatial distortion depending on the magnitude of beam divergence. Different angular sub-beamlets of the beam reflect at different depths. Not surprisingly, this group dispersion has a singularity at the critical angle, and tends to zero at grazing incidence. FIG. 4 shows the reflection phase and its $2^{nd}$ derivative with respect to incidence angle (the lowest order group spatial dispersion coefficient) for fused silica and $\lambda$=1550 nm. Avoiding the dispersion problem requires an even larger incident angle than necessary to avoid the transmission below critical angle problem. Consider an optical beam of Gaussian profile with $\lambda=1550$ nm, beam waist $w_0=0.5$ mm in the NPRR. This beam has 1/e field amplitude divergence radius of ~1 mrad. The transverse location of each beamlet is ~$\lambda\times$phase slope, which keeping only the $2^{nd}$ order term is $\lambda\times 1$ mrad$\times 2^{nd}$ derivative phase. For an incident angle of 60° (as in the example), FIG. 4 shows a $2^{nd}$ derivative of 4.5 rad/rad$^2$, so the difference in position between the two sides of the beam will be a few nm which is much less than the beam spot size, so 60° is definitely adequately large.

Figure 5A:
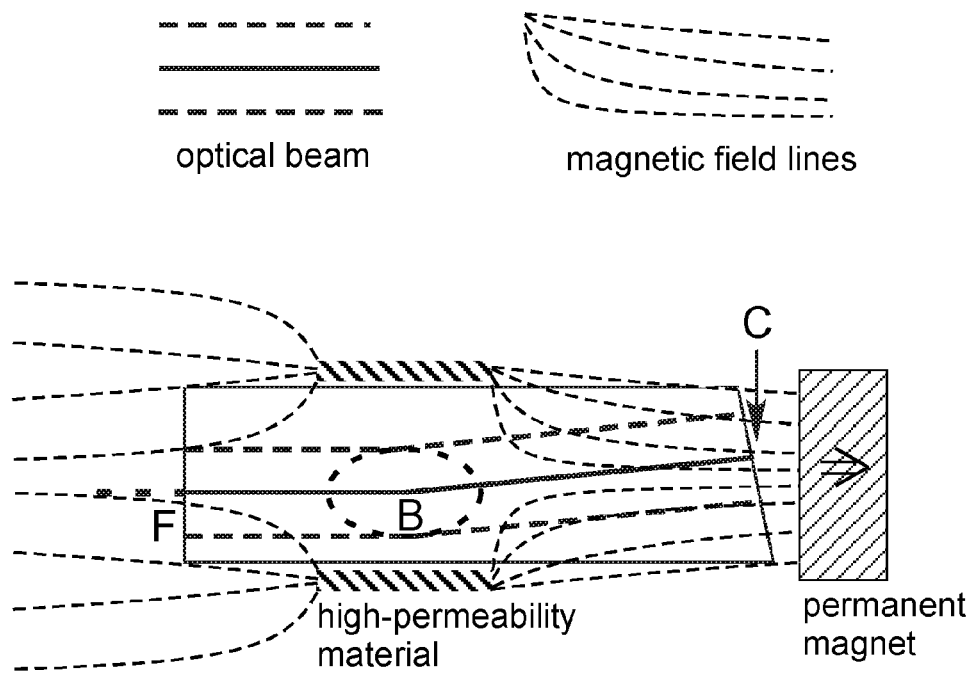
FIG. 5A shows a permanent magnet (rectangle with arrow adjacent to facet containing point C and strips of high-permeability material (shown as tube-like structures) which draw the field out of the NPRR before they reach facets containing points B and D, and then replace the field in the NPRR after those facets.
Figure 5B:
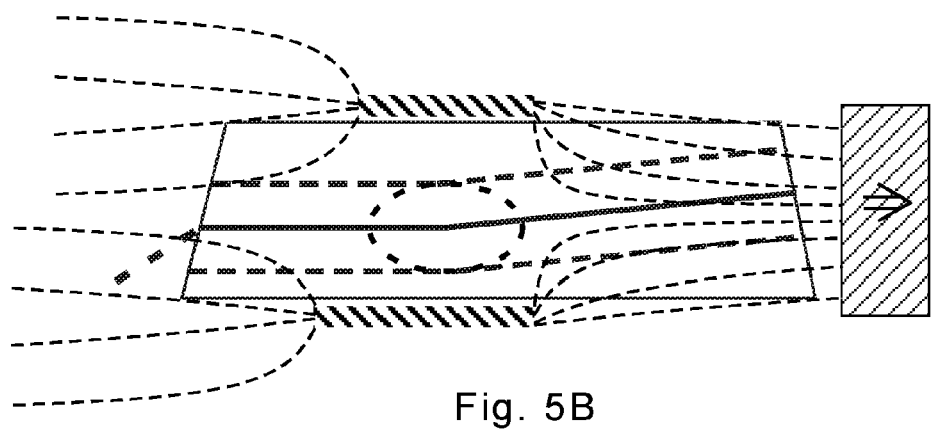
FIG. 5B is similar to 5A but facets containing points F and G are at Brewster's angle, and the high-permeability material is correspondingly asymmetric between top and bottom of the NPRR so that all portions of the beam experience the same field-path length product.

Second, consider the Faraday interaction with the finite transverse extent of the beam. Assuming negligible diffraction within each leg of the NPRR, different sub-spots within the beam each experience an amount of Faraday rotation proportional to their propagation length on each leg. Since the reflective interfaces B, C, and D (and possibly also the transmission interfaces F and G) are not at normal incidence, different sub-spots experience different amounts of polarization rotation. In the example, the interfaces F and G are at Brewster's angle, which is 35° from normal incidence. Given a beam field amplitude spot size w=0.5 mm, the difference in path length at F over 0.5 mm is ~0.28 mm. Similarly, at B, which is at 60° from normal incidence in a plane nearly perpendicular to F (so that it cannot compensate), the difference in path length is ~0.86 mm. Both these values are significant fractions of the length A'E=1.54 mm in the example. These deviations will couple the polarization with the diffraction in beam propagation, and increase the loss of the primary mode since it will no longer be purely S-polarized at the TIRs, or even entirely P-polarized at the Brewster angle interfaces F and G. The magnetic field overlapped with the beam within the NPRR needs to be shaped independently of the NPRR facets. Magnetic flux field lines can be directed with high-permeability materials such as "mu-metal" (a special nickel-iron alloy with molybdenum). Placing the high-permeability material around the NPRR shapes the magnetic field within it. FIGS. 5A, 5B, 5C and 5D show side views of several examples. FIG. 5A shows a permanent magnet (rectangle with arrow adjacent to facet C and strips of high-permeability material (shown as tube-like structures) which draw the field out of the NPRR before they reach facets B and D, and then replace the field in the NPRR after those facets. The area of beam reflection to be bypassed is shown as an ellipse at facet B. Both the magnets and high-permeability material extend across width of the NPRR (the dimension perpendicular to the views in FIGS. 5A-5D), or at least over the width of each optical beam segment, so that the magnetic field is uniform over the optical beam widths. Facets F and G are at normal incidence so that they do not introduce any Faraday rotation differential across the beam. The NPRR dimensions computed above need to be adjusted so that the B-field*beam path length products remain at the design value with the field modified by the high-permeability material. The placement and shapes of the magnet and the high-permeability material need to provide this design value uniformly over the optical beam cross-section. If diffraction is negligible and $\beta$ is very small, then the beam segments BC and CD also experience spatially uniform Faraday rotation since the end faces of the magnetic field at either end of the segments are parallel. FIG. 5B is similar to 5A but facets F and G are at Brewster's angle, and the high-permeability material is correspondingly asymmetric between top and bottom of the NPRR so that all portions of the beam experience the same field-path length product. Alternatively, more pieces of high-permeability material could be placed around facets F and G to bypass them.

Figure 5C:
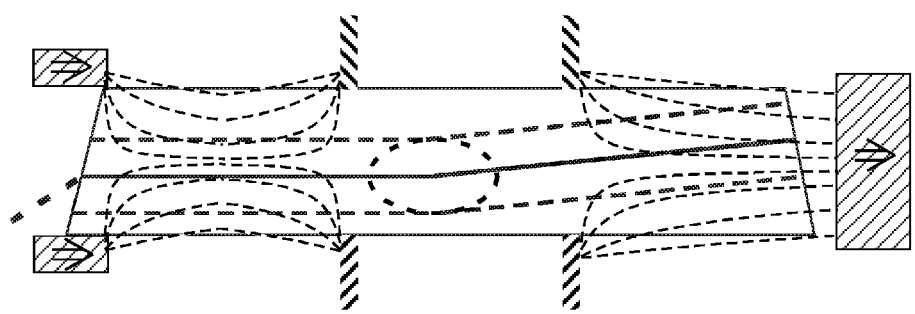
FIG. 5C shows strong magnets for segments BC and CD, and weak magnets for FB and DG.

Another solution is to provide a separate magnetic source for the different beam segments, one source for BC and CD, and another source for FB and DG. Then, their strengths can be different, and they can be shaped independently. Modifying the example above, FIG. 5C shows strong magnets for segments BC and CD, and weak magnets for FB and DG. High-permeability material completes the circuit of the field flux around the outside of the NPRR. Note also that the fields are at an angle with respect to the optical beam propagation and vary in magnitude over the beam segments. However, the integrals over each segment of the vector inner product of the beam propagation vector and the magnetic field are still the appropriate values, by appropriate design of the magnet placement and shape. A'E is now much longer than before since the magnets for beam sections FB and DG are weaker than the magnets for BC and CD, so that the field length product remains at the target value. Since the field is weaker and the length longer, the tolerance on the field shape and length is relaxed compared with using the same (strong) magnet for all segments. The magnets for segments BC and CD can be so that the magnetic field projected into the BCD plane is parallel to each of those two segments, or parallel to segments GD and FB, or any other angle. The only requirement is that the field*path length vector product is the same for both, so if the field strengths are equal for the two segments BC and CD, then the angles must be symmetric.

Figure 5D:
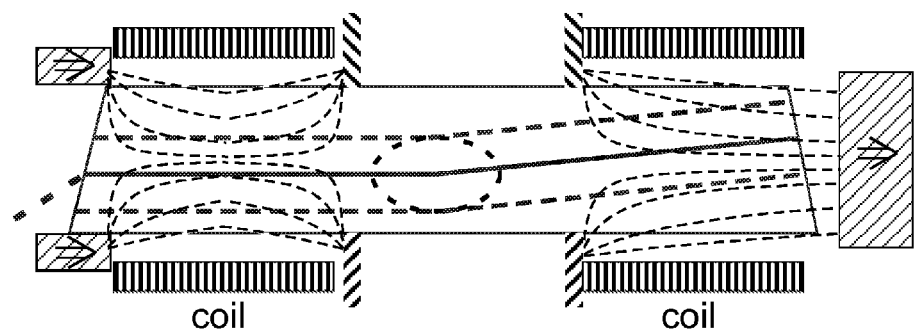
FIG. 5D shows coils in addition to separate permanent magnets for the different beam segments.

Induction coils can be added to fine-tune the magnetic field. FIG. 5D shows coils in addition to separate permanent magnets for the different beam segments. The coils wrap around the high-permeability material, which shapes their fields within the NPRR. The coil could also be wrapped around a single permanent magnet at C if the same field is to be applied to all segments, or around the NPRR itself, or around each or any individual permanent magnet in FIG. 5C. Such tunability can accommodate changes and drifts in the Faraday effect (due to temperature variation or wavelength shift). The field within a solenoid is $$B[\text{Tesla}]=4\pi 10^{-5}I[\text{amps}]n[\text{turns/cm}].$$

For n=1000, and I=1 amp, then B=0.1 Tesla, which is a significant fraction of the permanent field in the example (0.6 Tesla), offering ±17% tunability.

Figure 6A:
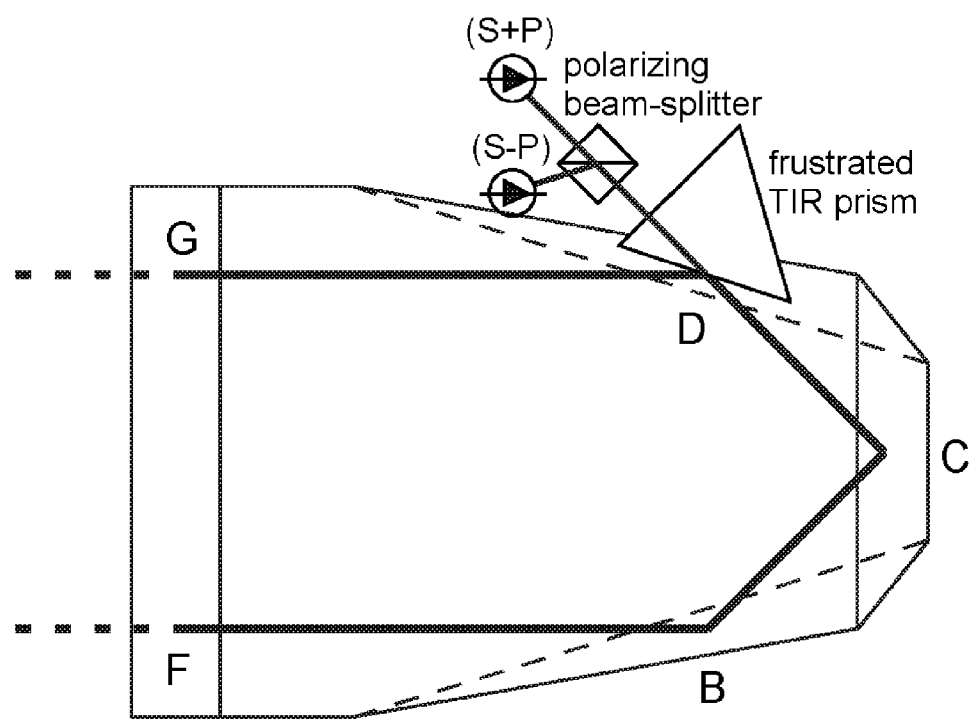
FIGS. 6A and 6B show via a top view and a side view, respectively, measurement of the polarization components at G and D (to provide independent error signals for independent fields on legs FB-DG and BC-CD).
Figure 6B:
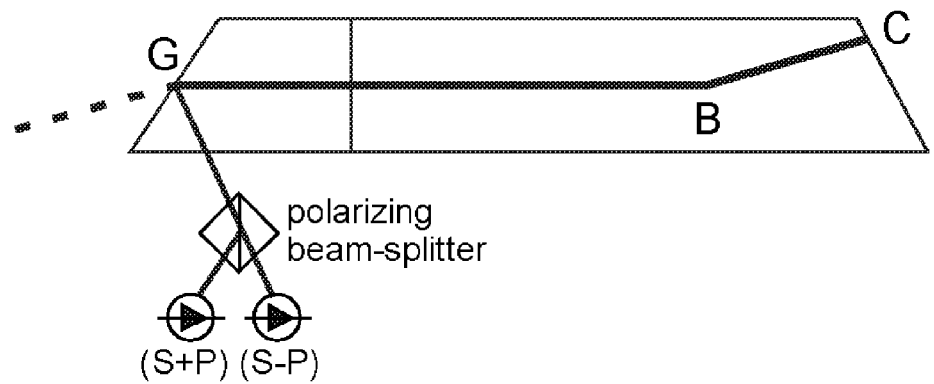

The quality of the cancellation between the coordinate rotation and the Faraday rotation appears in the S- and P-polarization components of the beam. If the cancellation is imperfect, then the beam will have some P-polarization (relative to the plane of the NPRR) after passing point G. Measuring the intensity and phase of the P-polarization component relative to the S component provides an error signal to adjust the magnetic field. FIGS. 6A and 6B show measurement of the polarization components at G and D (to provide independent error signals for independent fields on legs FB-DG and BC-CD). The facet G is slightly off from Brewster's angle to reflect a small amount of P-polarization (S- in plane of NPRR). The beam at D is observed by frustrating the TIR with a prism in proximity to the facet. Polarizing beam splitters oriented at 45° separate the mixed beams. Balanced detectors (difference signal normalized to the sum) monitor the signed amplitude of P-relative to S-component. The signed amplitude is a valid linear error signal. This mixed signal essentially measures the amount of total polarization rotation, and the balance determines if that amount is too CW or too CCW. As a simpler alternative, monitoring only the P-polarization would provide a positive-definite quadratic error signal (feedback control would need to minimize the error signal).

Designing and Adjusting the Resonator Coupling and Finesse

The facets F and G can be used for optical coupling to the resonator. Either a dielectric coating or a bare facet slightly different from Brewster's angle reflects a fraction of the S-polarization (P in the plane of the NPRR). The specification of these facets sets the minimum coupling at each. Especially in the case of the near Brewster's angle facet, however, controlling the quality of the polarization rotation cancellation also controls the amount of optical coupling, since the P-component (P in plane of NPRR, S at facets F and G) is preferentially coupled in or out. The magnetic coils described in the previous section can be used for this purpose. The error signals can also be used with an offset of the target error signal(s) away from zero. The magnitude of the offset determines the amount of optical coupling through P-polarization.

The ability to change the optical coupling is useful if the loaded losses of the resonator change. In an optical resonator, the best optical transmission occurs when the optical coupling equals the non-coupling losses. This is especially important for CEAS and CRDS. Often, when a strongly absorbing analyte is in the resonator, the optical signal is too low to measure accurately (e.g. to determine ring-down time). Increasing the coupling predictably at the peak of absorption can help to alleviate this problem.

Overcoupling is useful to fill the resonator with optical power quickly. Changing the coupling quickly when the power reaches some threshold then provides high power with high finesse (long ring-down time). Switching a magnetic coil rapidly requires some way to dump the field energy, such as a secondary coil to which the current is switched; the secondary coil would not provide field to the NPRR.

Alternative to facets F and G, any of the facets B, C, or D may be used for optical coupling. One of them could be a partially reflecting mirror (not TIR), with dielectric, metal, or no coating. Frustrated TIR is another method to couple at these facets. Placing a prism (of refractive index comparable or greater than the NPRR) near the facet collects a fraction of the evanescent field and transmits it through the prism. This is shown in FIGS. 6A and 6B at facet D, but the prism can be located at facet B or C instead. The separation between TIR and prism surfaces and their refractive indexes determine the amount of coupling. Changing the separation adjusts the coupling. A position transducer such as a piezo-electric transducer (e.g. a PZT) between the surfaces may be used to adjust the separation.

Additional Enhancements

High-finesse resonators, especially CRDS resonators, often require optical path length adjustment to obtain optical frequency coincidence with the optical beam. This is usually accomplished by moving one of the resonator mirrors with a piezo-electric transducer. Such movement risks position-dependent misalignment of the resonator that can affect the finesse dynamically, and great effort is spent to prevent this in practice. Alternatively, the optical path length through the NPRR is adjustable by varying its refractive index electro-optically (and its physical length piezo-electrically but without the same degree of misalignment). Fused silica is a poor choice to use these effects, as they are very small, but applying strain with an external PZT to the NPRR will induce a refractive index and/or physical path length change.

Bare TIR facets are susceptible to contamination by dust and adsorption, especially since they lie outside the resonator (inside of which is often a controlled, filtered or vacuum environment). Making these facets into dielectric mirrors with thick coatings prevents the evanescent field from penetrating outside the material and interacting with the contaminated external surface. In that case, the reflections are no longer TIR, and are subject to the intrinsic transmission and absorption loss of the dielectric coating. Another method to protect the TIR surfaces is to contact (or coat) a (thick) low-index material onto them. TIR is maintained provided the index ratio is sufficient. Since the lowest index solid materials available have n≈1.38 (e.g. $MgF_2$), fused silica is not compatible with only 3 TIRs, and a higher index substrate for the NPRR or more TIRs are necessary.

The NPRR can be designed with 4 (or more) TIR (or mirror reflection) facets and no external resonator section to make an evanescent wave resonator (e.g. evanescent wave CRDS). Everything in this invention description applies except that transmissive interfaces F and G become reflective interface A (as in the NPRO described by Nilsson), and point A' is coincident with point A.

Alternative Geometric Configuration with One Reflection

Figure 7A:
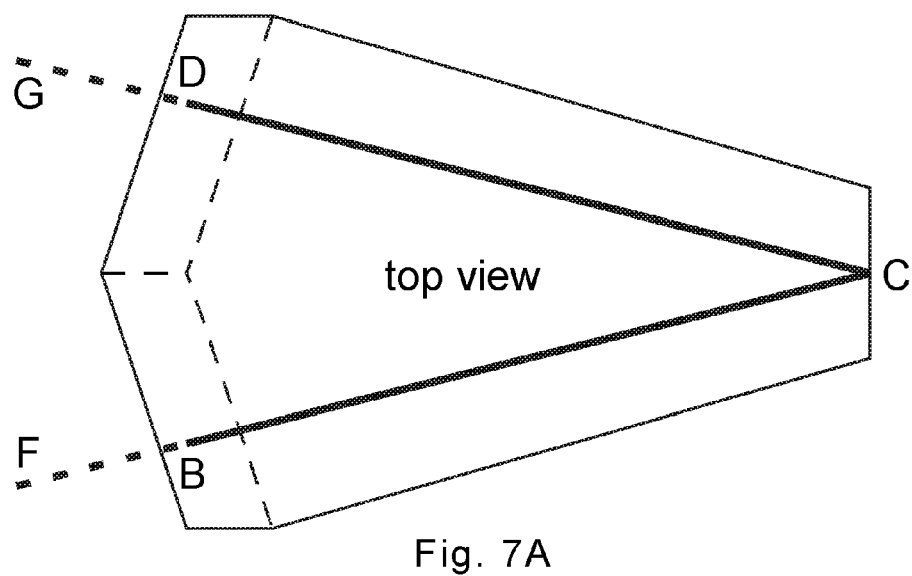
FIGS. 7A and 7B illustrate via a top view and a side view, respectively, that out-of-plane refraction can substitute for the out-of-plane reflections at points B and D.
Figure 7B:
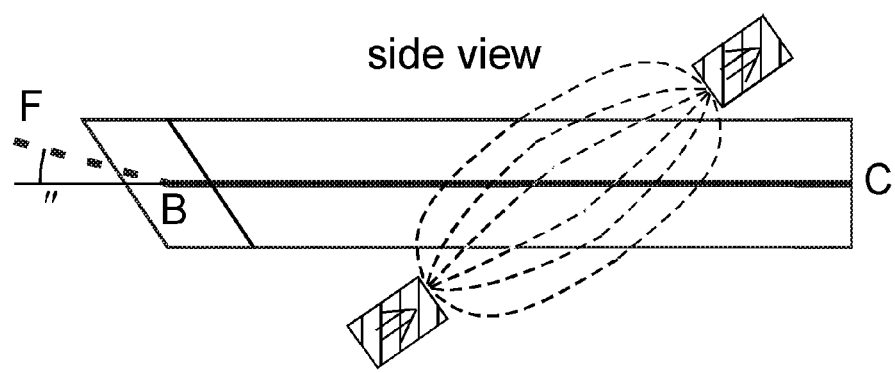

Out-of-plane refraction can substitute for the out-of-plane reflections at points B and D. FIGS. 7A and 7B illustrate this geometry. Note that the segments FB and DG are absent inside the NPRR substrate, and refraction occurs at B and D. Thus Faraday rotation is also absent on segments FB and DG. The Jones matrices of the individual segments and points remain the same, but now the total round-trip Jones matrices are $$M^+ = M_A R(\theta_{BC} - \gamma_{BC}) M_C R(\theta_{BC} + \gamma_{BC}),$$

$$M^- = R(\theta_{BC} - \gamma_{BC}) M_C R(-\theta_{BC} + \gamma_{BC}) M_A.$$

In the example in FIGS. 7A and 7B, planes FBC and GDC are perpendicular to plane ABD (which also contains points F and G). $\theta_{ext}$ is the counter-clockwise ($M^+$) direction incident angle at B, and $\theta_{int}$ is the refracted angle at B, related by Snell's law to $\theta_{ext}$. These same angles occur at D, where $\theta_{int}$ is the counter-clockwise direction incident angle (inside the NPRR) and $\theta_{ext}$ is the refracted angle (outside the NPRR). In this case, the trigonometric relations become $$\cos(\theta_{ext} - \theta_{int}) = \cos(\theta_C)\cos(\theta_F)\cos(\beta) - \sin(\theta_C)\sin(\theta_F)$$

$$0 = \cos(\theta_C)\sin(\theta_F)\cos(\beta) + \sin(\theta_C)\cos(\theta_F)$$

$$\sin(\theta_{BC}) = \frac{\sin(\theta_C)\cos(\theta_F)\cos(\beta) + \cos(\theta_C)\sin(\theta_F)}{\sin(\theta_{ext} - \theta_{int})}.$$

Note that the above equation for $\theta_{BC}$ uses $\sin(\theta_{BC})$ instead of $\cos(\theta_{BC})$ as in FIGS. 3A-3C. This is because of the absence of the FB leg, and the preference to obtain P polarization at B, which we will take to be at Brewster's angle for minimum loss, and S polarization at C, since S polarization reflects better than P. Then $\theta_C$ and $\beta$ can be obtained ($\theta_F$ is negative)

$$\sin(\theta_C) = -\sin(\theta_F)\cos(\theta_{ext} - \theta_{int})$$

$$\cos(\beta) = \cos(\theta_F)\cos(\theta_{ext} - \theta_{int})/\cos(\theta_C)$$

$$\cos(\theta_{BC}) = \frac{\sin(\theta_C + \theta_F)[\cos(\beta) + 1]}{\sin(\theta_{ext} - \theta_{int})}.$$

Consider for a numerical example the application to a triangular ring resonator as is currently used in some cavity ring-down spectroscopy devices. These resonators are typically isosceles triangles with two 250-mm legs and a 10-mm base. Note that the apex angle is 0.04 rad. In this case, a typical optical beam spot diameter is 1 mm, and a small divergence angle between the beams at F and G is desirable. Given these conditions, choose $\theta_F$=−0.02 rad (half of the apex angle of the resonator triangle; note negative sign)=−1.15°, fused silica for the BCD path of the beam, and $\theta_{ext}$=55.3° (Brewster's angle for fused silica). Then $\theta_{int}$=34.7° and $\theta_C$=0.0187 rad (1.07°). To obtain a convenient beam separation at F and G of 2 mm (FG=2 mm) requires CE=53 mm. The remaining angles are β=20.6°, and $\theta_{BC}$=−0.007 rad=−0.4°. A Faraday rotation of this $\theta_{BC}$ is obtained by applying a 0.038-Tesla magnetic field at 30° to the optical beams BC and CD over 40 mm length (similar to FIG. 5C or 5D).

We now must verify that the backward eigenmodes will not couple to the forward S-polarized mode. We leave the external mirrors relative phase $\Delta_A$ as arbitrary since they have incident angles near 45°, not near normal incidence. However, the reflection at C is near normal incidence so we take its relative phase as $\Delta_C$=180°. The loss of the S-polarization at B and D is 12.4% at each of B and D, and the loss for P-polarization is ~zero. The Jones matrices at A, B, and C are (full phases moved to P-polarization)

$$M_A = \begin{bmatrix} 0.876\exp(i\Delta_A) & 0 \\ 0 & 1 \end{bmatrix}, M_C = \begin{bmatrix} -1 & 0 \\ 0 & +1 \end{bmatrix}.$$

Computing the round-trip Jones matrices $$M^+ = M_A M_C = \begin{bmatrix} -0.876\exp(i\Delta_A) & 0 \\ 0 & 1 \end{bmatrix}$$

so that the eigenvalues are 1 and $-0.876\exp(-i\Delta_A)$.

$$M^- = R(2\theta_{BC})M_C R(-2\theta_{BC})M_A = \begin{bmatrix} -0.875\exp(i\Delta_A) & 0.0401 \\ -0.035\exp(i\Delta_A) & 0.9992 \end{bmatrix}.$$

Figure 8A:
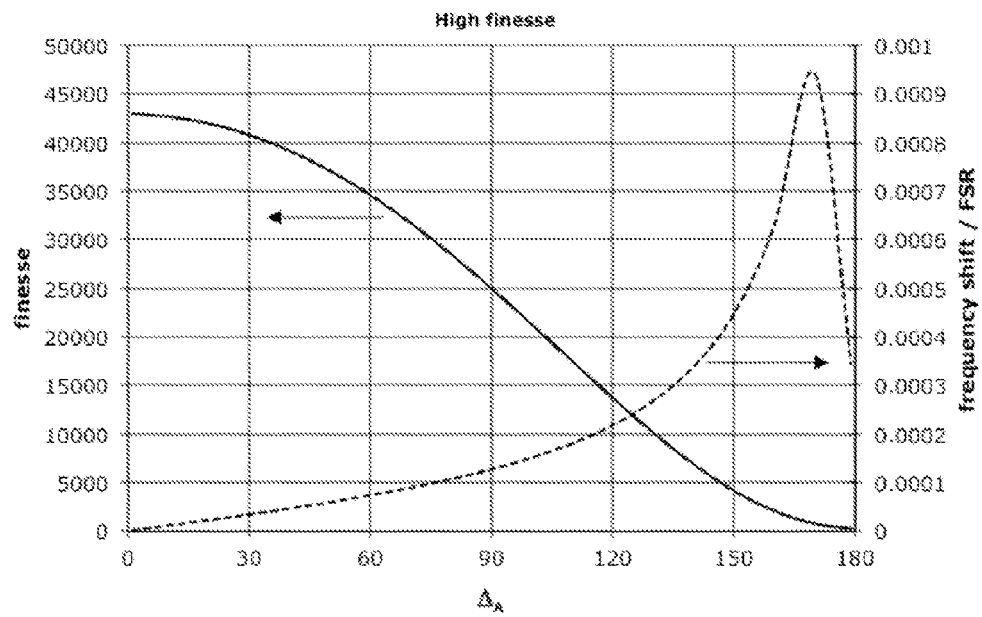
FIG. 8A shows results for a high-finesse mode.
Figure 8B:
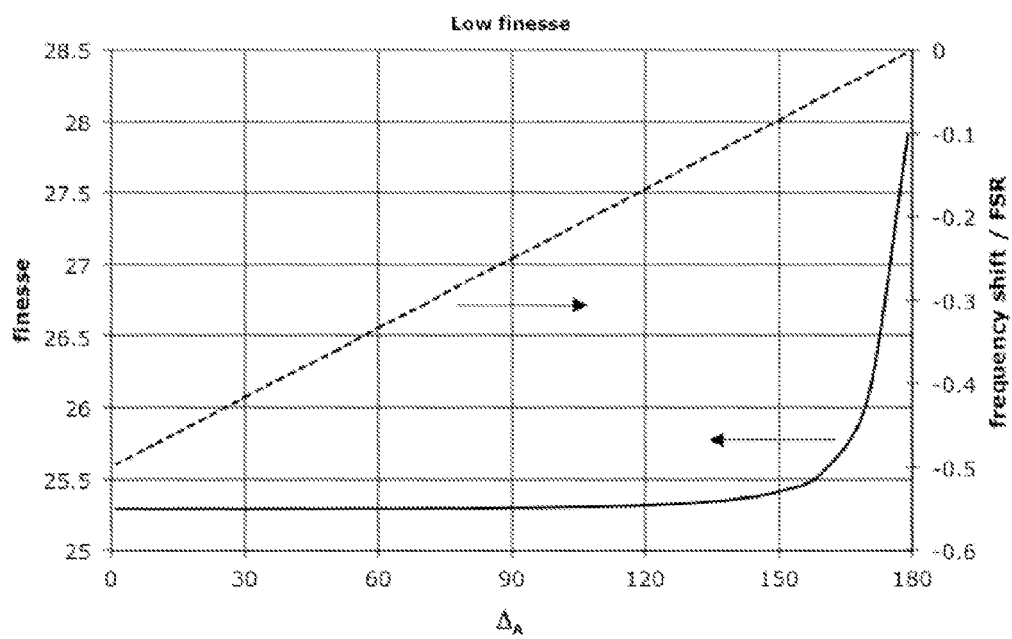
FIG. 8B shows results for a low-finesse mode.

The finesse values and frequency shifts (divided by the FSR) corresponding to its eigenvalues as functions of the phase $\Delta_A$ are shown in FIGS. 8A and 8B. FIG. 8A shows the results for the high-finesse mode, and FIG. 8B shows the results for the low-finesse mode. Either the frequency shift multiplied by the finesse needs to be large (>2) (assuming the backward high finesse is much less than the forward high finesse) so that the forward and backward modes do not couple significantly to each other, or the backward finesse needs to be much less than the forward high finesse (<1/10 of the forward high finesse) so that the backward mode loss is sufficiently high that power cannot accumulate in it. For a typical ring-down cavity, the (high) finesse is 100000 (total mirror losses of 60 ppm). From FIG. 8A, at least one of the above criteria is met for phase shift $\Delta_A$ in the range between 45° and 315°. The forward and backward high loss modes (eigenmode amplitude=0.876) have such high loss that they cannot accumulate any significant optical power, so their shift/line-width ratio is irrelevant. In addition, the polarization of each of the high loss modes is nearly perpendicular to the polarization of each of the low loss modes, further reducing the coupling efficiency between them.

Alternative Geometric Configuration with Two Reflections

Figure 9A:
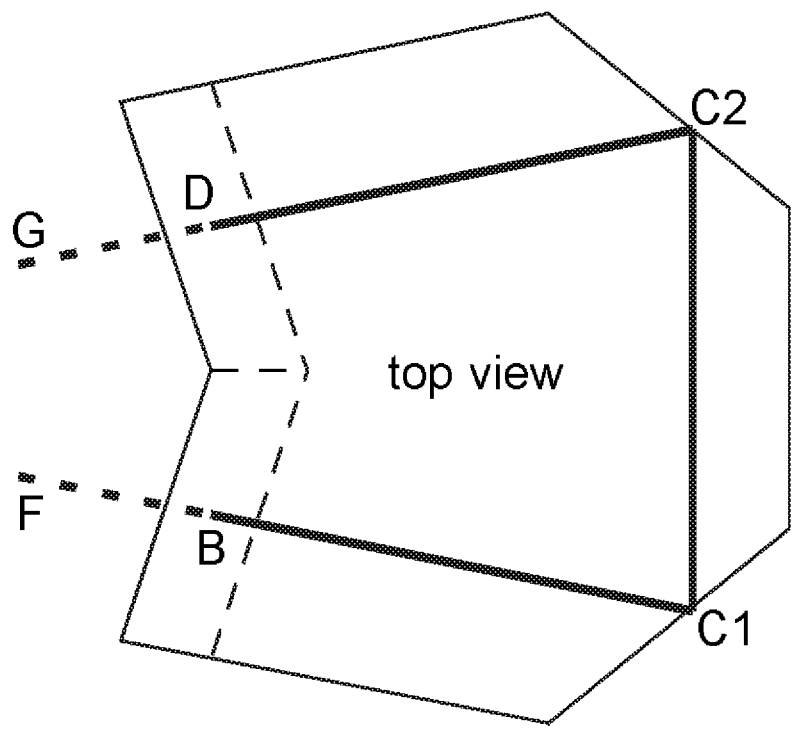
FIGS. 9A and 9B show a top view and a side view, respectively, of an implementation similar to that in FIGS. 7A and 7B, with two internal reflections instead of one so that the external beams along segments DG and FB converge instead of diverge.
Figure 9B:
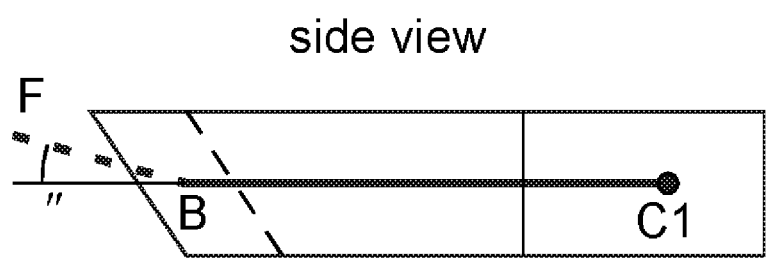

Given the inconvenience of the limited polarization phase range for which the one-reflection example in FIGS. 7A and 7B provide sufficient loss discrimination between the forward and backward modes, and the inconvenience of the size of the fused silica to separate the beams at F and G, consider now the case of two reflections inside the fused silica, effectively splitting point C in two. FIGS. 9A and 9B illustrate this geometry. This is almost identical to the example of FIGS. 7A and 7B, but now the external beams converge on a single external mirror ($\theta_F$>0). The Jones matrices of the individual segments and points remain the same, but now the total round-trip Jones matrices are $$M^+ = M_A R(\theta_{BC}-\gamma_{BC})M_{C1}M_{C2}R(\theta_{BC}+\gamma_{BC}),$$

$$M^- = R(\theta_{BC}-\gamma_{BC})M_{C2}M_{C1}R(-\theta_{BC}+\gamma_{BC})M_A.$$

Note that there is no Faraday rotation on the leg C1C2. This assumes that the magnetic field is perpendicular to C1C2. As in FIGS. 7A and 7B, planes FBC and GDC are perpendicular to plane FBD (which also contains point G). $\theta_{ext}$ is the counter-clockwise (M⁺) direction incident angle at B, and $\theta_{int}$ is the refracted angle at B, related by Snell's law to $\theta_{ext}$. These same angles occur at D, where $\theta_{int}$ is the counter-clockwise direction incident angle (inside the NPRR) and $\theta_{ext}$ is the refracted angle (outside the NPRR). In this example, the angles $\theta_{C1}$ and $\theta_{C2}$ are taken to be equal, although in general they do not need to be equal. The trigonometric relations are the same, except that $\theta_{C1}$ and $\theta_{C2}$ in FIGS. 9A and 9B each equal $\theta_C$ in FIGS. 7A and 7B, which will forthwith be labeled $\theta_C'$, divided by 2 plus 45° (π/4). The trigonometric results are the same, using $\theta_C'$ in place of $\theta_C$. Therefore $$\sin(\theta_C') = -\sin(\theta_F)\cos(\theta_{ext} - \theta_{int})$$

$$\cos(\beta) = \cos(\theta_F)\cos(\theta_{ext} - \theta_{int})/\cos(\theta_C')$$

$$\cos(\theta_{BC}) = \frac{\sin(\theta_C' + \theta_F)[\cos(\beta) + 1]}{\sin(\theta_{ext} - \theta_{int})}$$

$$\theta_{C1} = \theta_{C2} = \frac{\theta_C'}{2} + \frac{\pi}{4}.$$

Consider for a numerical example the application to a similar triangular ring resonator as was done for the case of FIGS. 7A and 7B. The apex angle at point A is 0.04 rad. Again, choose $\theta_F$=+0.02 rad (half of the apex angle of the resonator triangle; note positive sign)=1.15°, fused silica for the BC1C2D path of the beam, and $\theta_{ext}$=55.3° (Brewster's angle for fused silica). Then $\theta_{int}$=34.7° and $\theta_{C1,2}$=44.465°. Since the apex is at point A and assuming a typical ring-down cavity is 250 mm long, the beam separation at points F and G is 10 mm. There is no geometrical requirement on the lengths of BC1 or C2D. They need only be long enough so that the magnetic field required to obtain the necessary Faraday rotation is attainable. Similarly to the example for FIGS. 7A and 7B, the remaining angles are β=20.6°, and $\theta_{BC}$=+0.007 rad=+0.4° (note positive sign). A Faraday rotation of this $\theta_{BC}$ is obtained by applying a 0.30-Tesla magnetic field at 30° to the optical beams BC1 and C2D over 5 mm length (similar to FIG. 5C or 5D).

We now must verify that the backward eigenmodes will not couple to the forward S-polarized mode. In this case, the external mirror relative phase $\Delta_A$ is 180° since the incident angle is near normal incidence. The reflections at C1 and C2, however, are near 45° incidence and their relative phase is $\Delta_{C1,2}$=0.289 rad. The loss of the S-polarization at B and D is 12.4% at each of B and D, and the loss for P-polarization is ~zero. The Jones matrices at A, B, and C are (full phases moved to P-polarization)

$$M_A = \begin{bmatrix} -0.876 & 0 \\ 0 & 1 \end{bmatrix}, M_C = \begin{bmatrix} +0.959 + i0.285 & 0 \\ 0 & 1 \end{bmatrix}.$$

Computing the round-trip Jones matrices $$M^+ = M_A M_{C1} M_{C2} = \begin{bmatrix} 0.876 e^{-i2.56} & 0 \\ 0 & 1 \end{bmatrix}$$

so that the eigenvalues are 1 and $0.876 e^{-i2.56}$.

$$M^- = R(2\theta_{BC}) M_{C2} M_{C1} R(-2\theta_{BC}) M_A = \begin{bmatrix} -0.734 - 0.478i & 0.003 - 0.011i \\ -0.003 + 0.010i & 0.999 + 0.0002i \end{bmatrix}.$$

Its eigenvalues are $0.999995 e^{i0.00024}$ and $0.876 e^{-i2.56}$. To verify that the frequency shift of the first backward eigenmode is adequate, estimate the overlap of its Airy formula (e.g. the peak centered at the phase/$2\pi$ and with width equal to the finesse) with the Airy formula of a typical ring-down cavity (peak centered at 0 with finesse ~170000 based on total cavity loss of 40 ppm). This overlap can be estimated for widely separated peaks by the sum of the values of each Airy function at the centers of the other peak. For this example, this overlap is ~0.064. Compare this with an overlap of 1 if there is no frequency shift. This small overlap is deemed to be adequate if it is <0.10, which it is. The shift increases, and the overlap decreases, for larger $\theta_F$. The forward and backward high loss modes (eigenmode amplitude=0.876) have such high loss that they cannot accumulate any significant optical power.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. An optical traveling-wave resonator comprising:
   a magneto-optically active member through which an optical beam propagates on a non-planar optical propagation path circuit;
   at least one mirror in the optical propagation path circuit; and
   a magnetic field generator for applying a magnetic field to the magneto-optically active member such that resonant optical frequencies of normal modes corresponding to traveling waves in opposite directions are substantially different.

2. The resonator according to claim 1 further comprising:
   means for coupling a fraction of the optical beam traveling in at least one direction into and out of the resonator.

3. The resonator according to claim 1, wherein the magnetic field generator is capable of varying the magnetic field applied to the magneto-optically active member.

4. The resonator according to claim 1, wherein at least a portion of optical beam reflections within the magneto-optically active member are total internal reflections.

5. An optical traveling-wave resonator comprising:
   a magneto-optically active member through which an optical beam propagates on a non-planar optical propagation path circuit;
   at least one mirror in the optical propagation path circuit;
   a magnetic field generator for applying a magnetic field to the magneto-optically active member such that resonant optical frequencies of normal modes corresponding to traveling waves in opposite directions are substantially different; and
   means for coupling a fraction of the optical beam traveling in at least one direction into and out of the resonator, wherein the means for coupling a fraction of the optical beam traveling in at least one direction into and out of the resonator involves frustrating total internal reflection.

6. The resonator according to claim 1, wherein the at least one mirror is an external mirror, and wherein a surface of magneto-optically active member through which the optical beam passes along its path to and/or from the external mirror is at or nearly at Brewster's angle given the polarization for one normal mode of the resonator.

7. The resonator according to claim 1 further comprising:
   means for actively controlling the resonant frequency of a normal mode;
   wherein said means for actively controlling the resonant frequency of the normal mode functions by changing the optical path length of said normal mode through the magneto-optically active member or by changing a position of the magneto-optically active member within the resonator.

8. The resonator according to claim 1 further comprising:
   means for monitoring optical polarization of the optical beam traveling in a particular direction.

9. An optical traveling-wave resonator comprising:
   a magneto-optically active member through which an optical beam propagates on a non-planar optical propagation path circuit;
   at least one mirror in the optical propagation path circuit; and
   a magnetic field generator for applying a magnetic field to the magneto-optically active member such that resonant optical frequencies of normal modes corresponding to traveling waves in opposite directions are substantially different;
   wherein non-planarity of the optical propagation path circuit is accomplished by optical refraction at at least one surface of the magneto-optically active member.

10. The resonator according to claim 9, wherein only one reflection occurs internally within the magneto-optically active member.

11. The resonator according to claim 9, wherein at least two reflections occur internally within the magneto-optically active member.

* * * * *

UNITED STATES PATENT AND TRADEMARK OFFICE
CERTIFICATE OF CORRECTION

PATENT NO.        : 8,755,110 B2
APPLICATION NO.   : 13/687603
DATED             : June 17, 2014
INVENTOR(S)       : Bruce A. Richman Page 1 of 2

It is certified that error appears in the above-identified patent and that said Letters Patent is hereby corrected as shown below:

In the Drawings:

Fig. 3A should appear as follows:

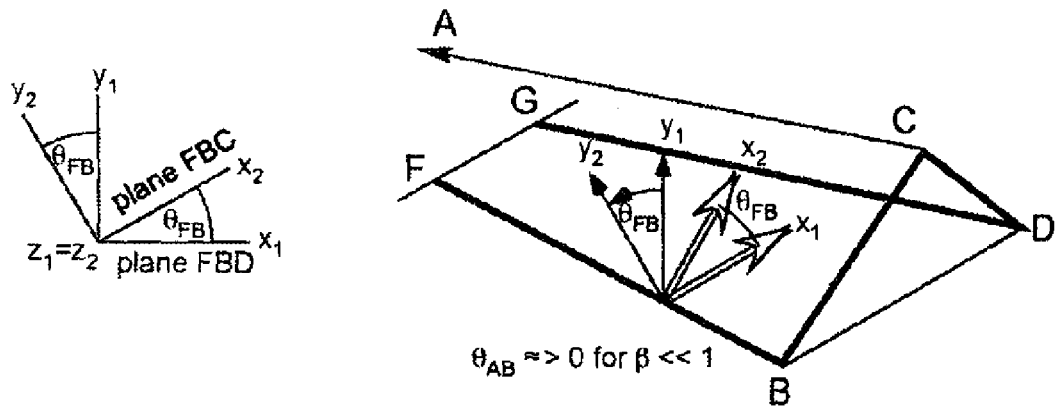

Fig. 3B should appear as follows:

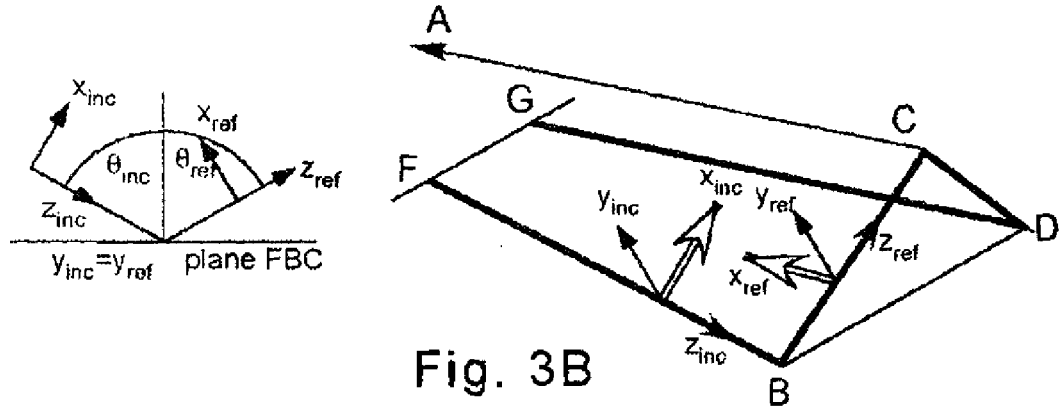

Signed and Sealed this
Thirtieth Day of September, 2014

Michelle K. Lee
*Deputy Director of the United States Patent and Trademark Office*

CERTIFICATE OF CORRECTION (continued)
U.S. Pat. No. 8,755,110 B2

Fig. 3C should appear as follows:

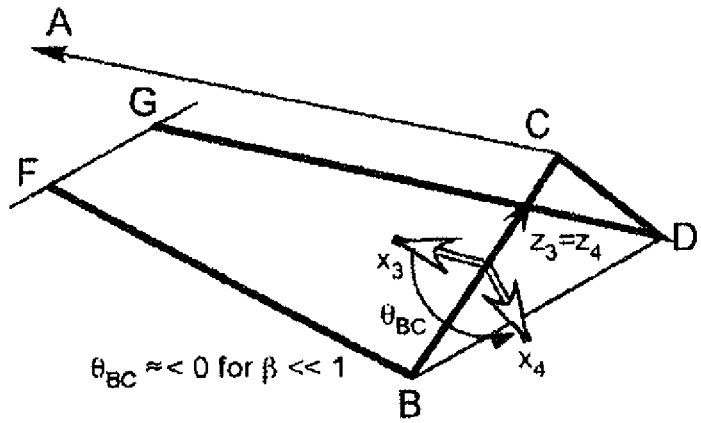

Fig. 3C

Fig. 7B should appear as follows:

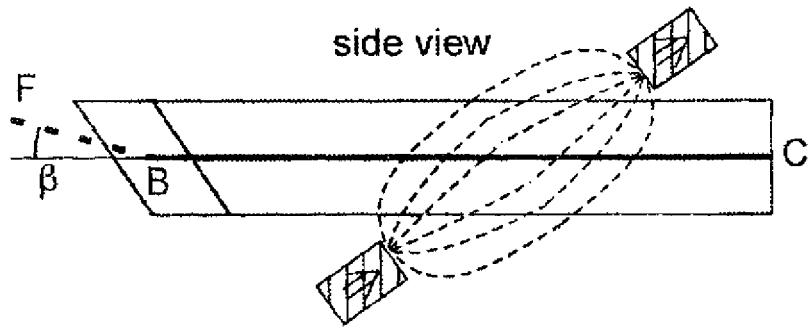

Fig. 7B

Fig. 9B should appear as follows:

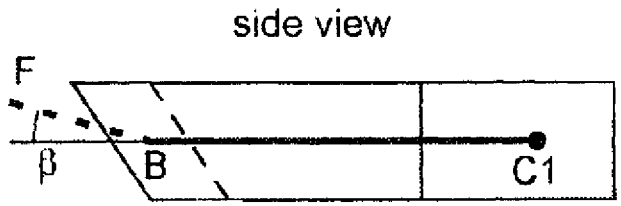

Fig. 9B